(12) United States Patent
Kirsch

(10) Patent No.: US 10,372,957 B2
(45) Date of Patent: Aug. 6, 2019

(54) APPARATUS AND METHOD FOR PROVIDING A GRAPHIC REPRESENTATION OR GRAPHIC REPRESENTATION SEQUENCE FOR DETECTION BY A DETECTOR

(71) Applicant: Pepperl+Fuchs GmbH, Mannheim (DE)

(72) Inventor: Martin Kirsch, Heddesheim (DE)

(73) Assignee: Pepperl+Fuchs GmbH, Mannheim (DE)

( * ) Notice: Subject to any disclaimer, the term of this patent is extended or adjusted under 35 U.S.C. 154(b) by 0 days.

(21) Appl. No.: 15/744,286

(22) PCT Filed: Sep. 15, 2015

(86) PCT No.: PCT/EP2015/071090
§ 371 (c)(1),
(2) Date: Jan. 12, 2018

(87) PCT Pub. No.: WO2017/045705
PCT Pub. Date: Mar. 23, 2017

(65) Prior Publication Data
US 2018/0211076 A1      Jul. 26, 2018

(51) Int. Cl.
*G06K 7/12* (2006.01)
*G06K 19/06* (2006.01)

(52) U.S. Cl.
CPC .......... *G06K 7/12* (2013.01); *G06K 19/0614* (2013.01)

(58) Field of Classification Search
CPC .............................. G06K 7/12; G06K 19/0614
See application file for complete search history.

(56) References Cited

U.S. PATENT DOCUMENTS

2006/0283952 A1* 12/2006 Wang ................. G06K 7/10722
235/462.01
2008/0265036 A1   10/2008 Wichers
2013/0329006 A1   12/2013 Boles et al.

FOREIGN PATENT DOCUMENTS

EP         0342772 A2    11/1989

OTHER PUBLICATIONS

International Searching Authority, International Search Report and Written Opinion for International Application No. PCT/EP2015/071090, dated Jun. 10, 2016, 8 pages, European Patent Office, Netherlands.

* cited by examiner

*Primary Examiner* — Sonji N Johnson
(74) *Attorney, Agent, or Firm* — Alston & Bird LLP

(57) ABSTRACT

For providing an apparatus and method for providing a graphic representation (1, 2) or a graphic representation sequence for detection by a detector (3) which provide a simple and effective variation of a graphic representation (1, 2) or a graphic representation sequence for detection by the detector (3) an apparatus is claimed, comprising: at least one light source (4, 5) emitting at least one definable light color or light color spectrum, a colored graphic representation (1, 2) or graphic representation sequence, wherein the at least one light source (4, 5) illuminates the colored graphic representation (1, 2) or graphic representation sequence, so that depending on the at least one light color or light color spectrum the colored graphic representation (1, 2) or a part of the colored graphic representation (1, 2) is visible by the detector (3) with a predefinable intensity and/or color or not, and a control unit (6) for defining and providing an illumination sequence of the at least one light source (4, 5) for providing a change of visibility of the graphic representation (Continued)

(1, 2) or of a part of the graphic representation (1, 2) by the detector (3). Further, a corresponding method is claimed.

12 Claims, 4 Drawing Sheets

| r001 | r002 | r003 | r004 | r005 |
| g501 | g502 | g503 | g504 | g505 |

APPARATUS AND METHOD FOR PROVIDING A GRAPHIC REPRESENTATION OR GRAPHIC REPRESENTATION SEQUENCE FOR DETECTION BY A DETECTOR

CROSS REFERENCE TO RELATED APPLICATIONS

This application is a National Stage Application, filed under 35 U.S.C. 371, of International Application No. PCT/EP2015/071090, filed Sep. 15, 2015; the contents of which are hereby incorporated by reference in their entirety.

BACKGROUND

Related Field

The present invention relates to an apparatus and a method for providing a graphic representation or graphic representation sequence for detection by a detector.

Various apparatuses and methods for providing a graphic representation or graphic representation sequence for detection by a detector are known from prior art. For example, in the field of image processing, it is known to provide a graphic representation to be detected by a detector for analyzing purposes.

For achieving reliable analysis results it is very important that the detector works correctly. For verifying correct function of the detector a definable graphic representation or graphic representation sequence can be provided and a detection result can be compared with the provided representation or representation sequence. If no coincidence or relation between the provided representation or representation sequence and the data detected by the detector can be determined, a malfunction of the detector can be the reason for the missing coincidence or relationship. In this case, the detector can be replaced by a correctly working detector, for example.

BRIEF SUMMARY

Thus, it is an object of the present invention to provide an apparatus and method for providing a graphic representation or graphic representation sequence for detection by a detector, which provide a simple and effective variation of a graphic representation or a graphic representation sequence for detection by the detector.

In accordance with the invention, the aforementioned object is accomplished by an apparatus comprising the features of claim 1. The apparatus comprises at least one light source emitting at least one definable light colour or light colour spectrum, a coloured graphic representation or graphic representation sequence, wherein the at least one light source illuminates the coloured graphic representation or graphic representation sequence, so that depending on the at least one light colour or light colour spectrum the coloured graphic representation or a part of the coloured graphic representation is visible by the detector with a predefinable intensity and/or colour or not, and a control unit for defining and providing an illumination sequence of the at least one light source for providing a change of visibility of the graphic representation or of a part of the graphic representation by the detector.

Further, the aforementioned object is accomplished by a method according to claim 12, wherein at least one light source emits at least one definable light colour or light colour spectrum for illuminating a correspondingly coloured graphic representation or graphic representation sequence, so that depending on the at least one illuminating light colour or light colour spectrum the coloured graphic representation or a part of the coloured graphic representation is visible by the detector with a predefinable intensity and/or colour or not, and wherein a control unit defines and provides an illumination sequence of the at least one light source for providing a change of visibility of the graphic representation or of a part of the graphic representation by the detector.

According to the invention it has first been recognized that a suitable illumination of a graphic representation or graphic representation sequence can provide the basis for a simple and effective variation of a graphic representation or a graphic representation sequence. Further, it has been recognized that the use of at least one light source emitting at least one definable light colour or light colour spectrum will provide the intended success, if used in combination with a coloured graphic representation or graphic representation sequence. In this case, the at least one light source illuminates the coloured graphic representation or graphic representation sequence, so that depending on the at least one light colour or light colour spectrum the coloured graphic representation or a part of the coloured graphic representation is visible by the detector with a predefinable intensity or not. For example, a green coloured graphic representation is visible darkly or with only low intensity, if illuminated by red light or vice versa. For providing a suitable definition of the illumination of the coloured graphic representation or graphic representation sequence a control unit is provided for defining and providing a corresponding illumination sequence of the at least one light source for providing a change of visibility of the graphic representation or a part of the graphic representation by the detector. By means of a suitable illumination sequence a switching of an image content of the detector can be provided in a simple way.

Thus, the inventive apparatus and method provide a simple and effective variation of a graphic representation or a graphic representation sequence for detection by the detector by simply varying the illumination of at least one light source.

Within a preferred embodiment an illumination sequence can comprise altering of the light colour or light colour spectrum of the illumination. For example, by switching the light colour between red and green corresponding green and red graphic representations can be visible in a dark colour by the detector. Depending on the colouration of the graphic representation with for example different parts having different colours, individual and different parts of the graphic representation can be visible by the detector depending on the illumination light colour.

Additionally or alternatively an illumination sequence can comprise an activation or deactivation of the at least one light source. Thus, a variation of the content to be detected by the detector can be switched by simply activating or deactivating the at least one light source for providing visibility or non-visibility of a graphic representation.

For realizing a very flexible and still cost effective and simple apparatus, the apparatus can comprise two light sources emitting a different light colour or light colour spectrum. In this case, one light source could emit a red colour and the other light source could emit a green colour, for example. A wide plurality of different graphic representations can be provided on the basis of such an arrangement depending on the colouration of the graphic representation or graphic represention sequence.

A suitable graphic representation can be realized in many different ways. For example, the graphic representation can comprise a code, code sequence, binary code, bar code or data matrix code or a combination or superposition thereof.

Depending on the individual colouration of the graphic representation a plurality of different graphic representations can be provided on the basis of such representations.

Corresponding to the light colour or light colour spectrum emitted by the at least one light source the graphic representation can comprise different colours, preferably within the visible or adjacent infrared, IR, or ultraviolet, UV, spectrum. The selection of the colours of the graphic representation has to be adapted to the design of the detector, so that the detector is able to detect said colours.

For providing a wide range of different graphic representations and detection situations the illuminating light colours or light colour spectrums and the colours of a graphic representation can be selected in a way, that a background of the graphic representation is detected as a dark or bright region by the detector. For example, a background of the graphic representation—for example a data matrix code—can be provided with a blue colour for providing a dark background, if the illumination is provided with a complementary colour such as red or green. Depending on the individual detector a better differentiation of visible or not visible parts of a graphic representation can be achieved by such a selection of the background detectability.

Within a preferred embodiment the graphic representation can comprise colour or material, e.g. an ink, activatable by IR or UV radiation. In this case, the visibility of the colour or material is provided by a suitable IR or UV radiation.

Within a further preferred embodiment the graphic representation can comprise a three-dimensional, 3D, surface structure for providing different colour aspects depending on the angle of view. A smaller angle of view can provide visibility of another colour as a larger angle of view. A suitable movability of the detector can be provided in this case for realizing a definable tilt enabling the detector to detect a predefined colour. Alternatively, the graphic representation with the 3D surface structure could be tilted in the necessary way for enabling the detector to detect a predefined colour. According to a further alternative both, the detector and the graphic representation can be tilted in the necessary way for providing reliable detection of the predefined colour by the detector.

According to a further preferred embodiment of the inventive apparatus and method the at least one light source can emit polarized light or can comprise a polarizer for providing polarized light. Thus, only light having a predefinable polarization could be detected by the detector for providing variations of the graphic representation to be detected by the detector. A polarizer could comprise suitable polarizing material or a polarizing filter.

For providing an effective evaluation of data detected by the detector the apparatus can comprise evaluating means for verifying a coincidence or relationship of the provided graphic representation or graphic representation sequence with corresponding data detected by the detector. Thus, functioning of the detector can be verified by detection and evaluation of the image of a graphic representation or a graphic representation sequence provided by generating means of the apparatus, for example. If such an image within the detector is frozen or if a software has hung up or has a time shift/delay no corresponding data will be detected by the detector and the detector can be qualified as malfunctioning or not functioning. Corresponding maintenance activities could be initiated in such a situation.

BRIEF DESCRIPTION OF THE FIGURES

There are several ways how to design and further develop the teaching of the present invention in an advantageous way. To this end it is to be referred to the patent claims subordinate to patent claim 1 on the one hand and to the following explanation of preferred embodiments of the invention, by way of example, illustrated by the figures on the other hand. In connection with the explanation of the preferred embodiments of the invention by the aid of the figures, generally preferred embodiments and further developments of the teaching will be explained. In the drawing FIG. 3 is a schematic view of another embodiment of a graphic representation for use with the apparatus of FIG. 1

DETAILED DESCRIPTION OF VARIOUS EMBODIMENTS

Figure 1:
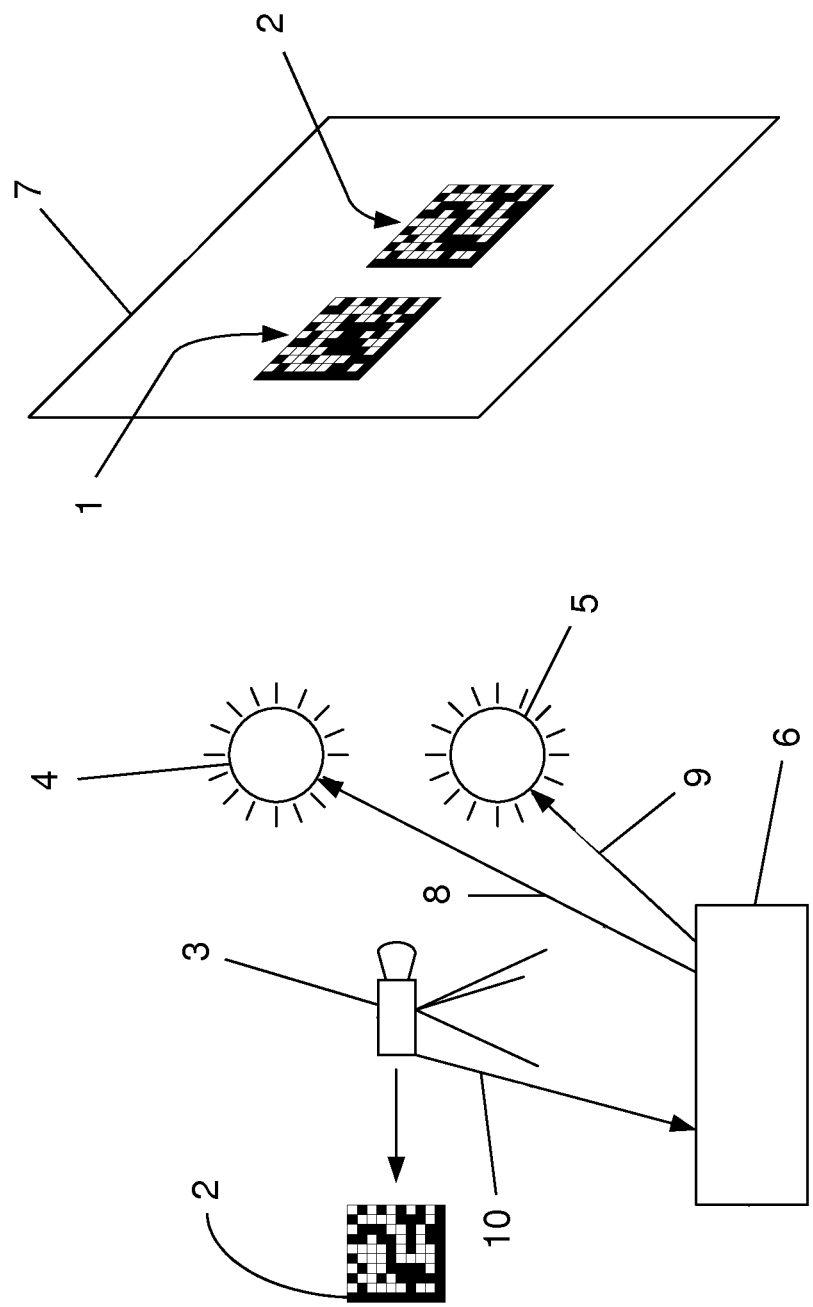
FIG. 1 is a schematic and partly perspective view of an apparatus for providing a graphic representation according to an embodiment of the present invention.

FIG. 1 shows an embodiment of an apparatus for providing a graphic representation 1, 2 or graphic representation sequence for detection by a detector 3. The apparatus comprises two light sources 4, 5 emitting two different light colours. The graphic representations 1, 2 are coloured, wherein the light sources 4, 5 illuminate the coloured representations 1, 2, so that depending on the light colours emitted by the light sources 4, 5 the coloured graphic representations 1, 2 or a part of the coloured graphic representations 1, 2 is visible by the detector 3 with a predefinable intensity or not. Further, the apparatus comprises a control unit 6 for defining and providing an illumination sequence of the light sources 4, 5 for providing a change of visibility of the graphic representations 1, 2 or a part of the graphic representations 1, 2 by the detector 3. By means of the embodiment a simple and effective variation of graphic representations 1, 2 for detection by the detector 3 is provided. The detector 3 shown within FIG. 1 is a digital camera.

The graphic representations 1, 2 are visible within a detection range 7 of the detector 3. The light sources 4 and 5 can be realized within one single illumination module.

The graphic representations 1 and 2 are coloured in different colours, so that depending on the illuminating light colours provided by the light sources 4 and 5 one or both of the graphic representations 1, 2 are visible by the detector 3 or not.

According to the embodiment of FIG. 1 the graphic representations 1 and 2 are realized by data matrix codes wherein said graphic representation 1 is red and the graphic representation 2 is green, for example, wherein the illustration according to FIG. 1 is only showing black regions on a white background.

The graphic representations 1 and 2 are detected by the detector 3. Light source 4 provides red light and light source 5 provides green light. If light source 4 is activated with its red light, the graphic representation 2 is detected as dark illustration or as illustration with low intensity, as the red light will be absorbed from the green colour of representation 2. Representation 1 is nearly invisible for the detector 3 in this case, as nearly the complete red light will be reflected. In this case detector 3 detects only representation 2, as indicated within FIG. 1. If light source 5 is activated with its green illumination, the red representation 7 is visible and the green representation 2 disappears. In this case detector 3 detects representation 1.

The selection of the illumination is realized by control unit 6 which can define an illumination sequence of the light sources 4, 5 for providing a change of visibility of the graphic representations 1, 2 by the detector 3. Control unit 6 selects the illumination sequence according to a predefined schedule via control lines 8 and 9. Depending on an illumination by light source 4 or 5 the detector 3 informs the control unit 6 regarding the detected representations 1 or 2 via line 10 and/or transmits the detected representation 1 or 2 via line 10 to the control unit 6. The detector 3 receives no information regarding the provided illumination colour and detects only the situation within its detection range 7. The control unit 6, however, has the information of the performed illumination sequence and compares the detection result by detector 3 with the expected result. The control unit 6 comprises respecting evaluating means for verifying a coincidence or relationship of the provided graphic representations 1 or 2 with corresponding data detected by the detector 3. Thus, the control unit 6 with its evaluating means can verify, whether the software within detector 3 is still correctly functioning or is possibly frozen or hung up or delayed.

Thus, on the basis of the illustrated embodiment of the invention a verification regarding correct functionality of the detector 3 is possible with the same detector 3. Provision of a second detector 3 is not necessary. The evaluating means can be realized as a separate element or can be realized as a combined module together with control unit 6. Detector 3 is typically a grayscale camera. However, the use of a colour camera is also possible.

Figure 2:
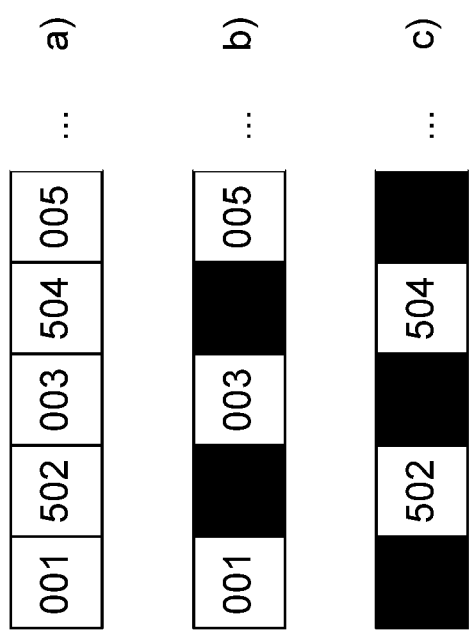
FIG. 2 is a schematic view of various embodiments of graphic representations for use with the apparatus of FIG. 1.

FIGS. 2 and 3 show various possible graphic representations for use with the apparatus according to FIG. 1.

FIG. 2a) shows a suitable arrangement of codes for positioning systems. These codes comprise an increasing position indication. However, each second code is increased with a position offset, here 500. These codes are coloured alternately with two suitable colours, for example, red and green. The different colours are represented by different hatching patterns. Thus, depending on the light colour of the illumination—red or green, for example—an image according to b) or an image according to c) is the result. A positioning determination apparatus can determine a unique position in both cases. However, the position differs regarding the position offset. A suitable control unit 6, which knows the actual illumination, can provide a suitable evaluation and can subtract the offset, so that the same position results under use of the evaluation.

The above code arrangement according to FIG. 2 has the problem that the respective codes have a significant distance from each other due to the offset. Position gaps are provided by the dark regions within b) and c). This can result in a deterioration regarding the positioning performance. This problem can be avoided by a code arrangement according to FIG. 3. In this case no position gaps are present. The character "r" indicates the colour red and the character "g" indicates the colour green. As a result a red illumination provides visibility of the codes 501, 502, . . . and green illumination provides visibility of the codes 001, 002, . . .

Figure 4:
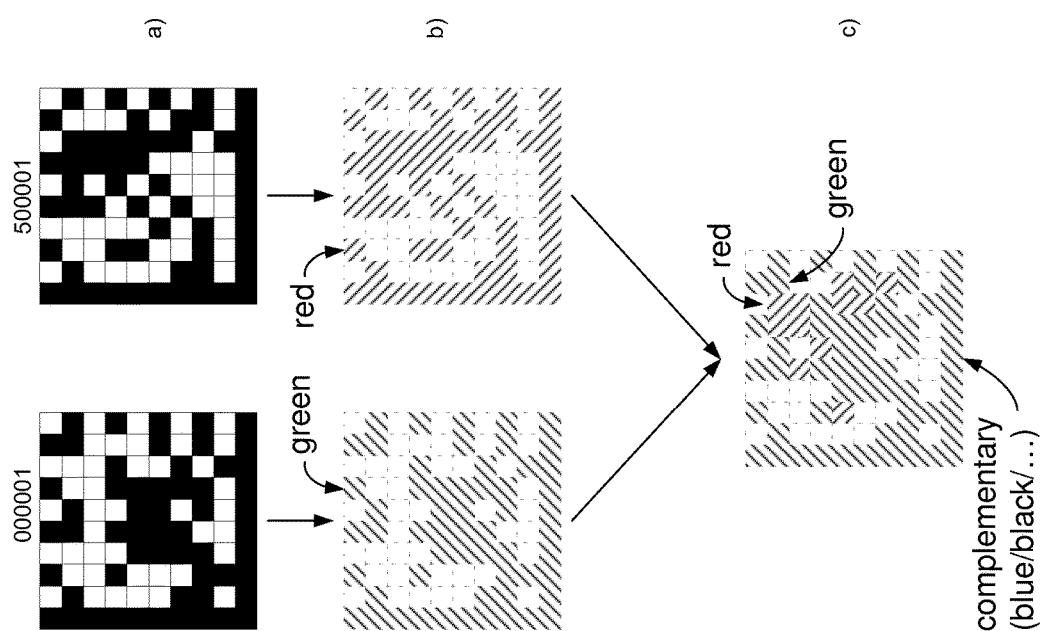
FIG. 4 is a diagram showing a possible superposition of two coloured data matrix codes for use with an apparatus according to the invention.

A further example of a graphic representation being useful in connection with the generating means is shown within FIG. 4. Codes 000001 and 500001 are shown as data matrix codes. Code 000001 shall be visible with red illumination. In FIG. 4a) both codes are illustrated. Code 000001 is coloured green and code 500001 is coloured red according to FIG. 4b). Within FIG. 4c) both codes are superposed. If a part of said superposition shall be dark—visible—under red and also under green illumination, this part is coloured in the complementary colour or in a colour which is dark for both illumination colours.

The above mentioned colours are only examples. Within a further embodiment the background of the representations can be realized by a colour being complementary—blue, black, . . . —to the colours of the representation. In this case, the detection result is interchanged. The reason is that a red code is bright under red illumination. The green code, however, is detected as dark region like the background. Thus, the codes will be detected inversely within the detector or camera. The advantage of this embodiment is the fact, that the adaptation of the light sources to the colours is not so relevant. Usually, the respective other code is detected as dark region on a bright background, if the background is blue, wherein such a blue background is the complementary colour to red and green. Usually, this can be clearly distinguished by a camera.

The illustrated embodiment is based on a data matrix code. However, this embodiment is also applicable to all binary codes in the same way, for example bar codes, QR-codes and shotcodes.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE SIGNS 1 graphic representation
2 graphic representation
3 detector
4 light source
5 light source
6 control unit
7 detection range
8 control line
9 control line

The invention claimed is:
1. Apparatus for providing a graphic representation (1, 2) or graphic representation sequence for detection by a detector (3), the apparatus comprising:
   at least one light source (4, 5) emitting at least one definable light colour or light colour spectrum,
   a coloured graphic representation (1, 2) or graphic representation sequence, wherein the at least one light source (4, 5) illuminates the coloured graphic representation (1, 2) or graphic representation sequence, so that depending on the at least one light colour or light colour spectrum the coloured graphic representation (1, 2) or a part of the coloured graphic representation (1, 2)

is either visible by the detector (3) with at least one of a predefinable intensity or a predefinable colour or not visible by the detector (3), a control unit (6) configured for defining and providing an illumination sequence of the at least one light source (4, 5), so as to provide a change of visibility of the graphic representation (1, 2) or of a part of the graphic representation (1, 2) by the detector (3), and evaluating means configured for:
verifying a coincidence or relationship of the provided graphic representation (1, 2) or graphic representation sequence with corresponding data detected by the detector (3); and when the coincidence or relationship cannot be verified, identifying the detector (3) as experiencing a malfunction.

2. The apparatus according to claim 1, wherein an illumination sequence comprises altering of the light colour or light colour spectrum of the illumination.

3. The apparatus according to claim 1, wherein an illumination sequence comprises an activation or deactivation of the at least one light source (4, 5).

4. The apparatus according to claim 1, wherein two light sources (4, 5) emitting a different light colour or light colour spectrum are provided.

5. The apparatus according to claim 1, wherein the graphic representation (1, 2) comprises a code, code sequence, binary code, bar code or data matrix code or a combination or superposition thereof.

6. The apparatus according to claim 1, wherein the graphic representation (1, 2) comprises different colours.

7. The apparatus according to claim 6, wherein the different colours are within the visible or adjacent infrared, IR, or ultraviolet, UV, spectrum. the visible or adjacent infrared, IR, or ultraviolet, UV, spectrum.

8. The apparatus according to claim 1, wherein the illuminating light colours or light colour spectrums and the colours of a graphic representation (1, 2) are selected in a way, that a background of the graphic representation (1, 2) is detected as a dark or bright region by the detector (3).

9. The apparatus according to claim 1, wherein the graphic representation (1, 2) comprises colour or material activatable by IR or UV radiation.

10. The apparatus according to claim 1, wherein the graphic representation (1, 2) comprises a three-dimensional, 3D, surface structure for providing different colour aspects depending on the angle of view.

11. The apparatus according to claim 1, wherein the at least one light source (4, 5) emits polarized light or comprises a polarizer for providing polarized light.

12. Method for providing a graphic representation (1, 2) or graphic representation sequence for detection by a detector (3), particularly performed by an apparatus according to claim 1, the method comprising the steps of:

emitting, via the at least one light source (4, 5), the at least one definable light colour or light colour spectrum for illuminating a correspondingly coloured graphic representation (1, 2) or graphic representation sequence, so that depending on the at least one illuminating light colour or light colour spectrum the coloured graphic representation (1, 2) or the part of the coloured graphic representation (1, 2) is visible by the detector (3) with the predefinable intensity and/or colour or not, defining and providing, via the control unit (6), the illumination sequence of the at least one light source (4, 5) for providing the change of visibility of the graphic representation (1, 2) or of the part of the graphic representation (1, 2) by the detector (3), verifying, via the evaluating means, the coincidence or relationship of the provided graphic representation (1, 2) or graphic representation sequence with the corresponding data detected by the detector (3), and when the coincidence or relationship cannot be verified, identifying, via the evaluating means, the detector (3) as experiencing a malfunction.

\* \* \* \* \*